Dec. 13, 1938.　　　H. E. WHITE　　　2,140,488
APPARATUS FOR MAKING WIRE MESH
Filed April 20, 1936　　15 Sheets-Sheet 1
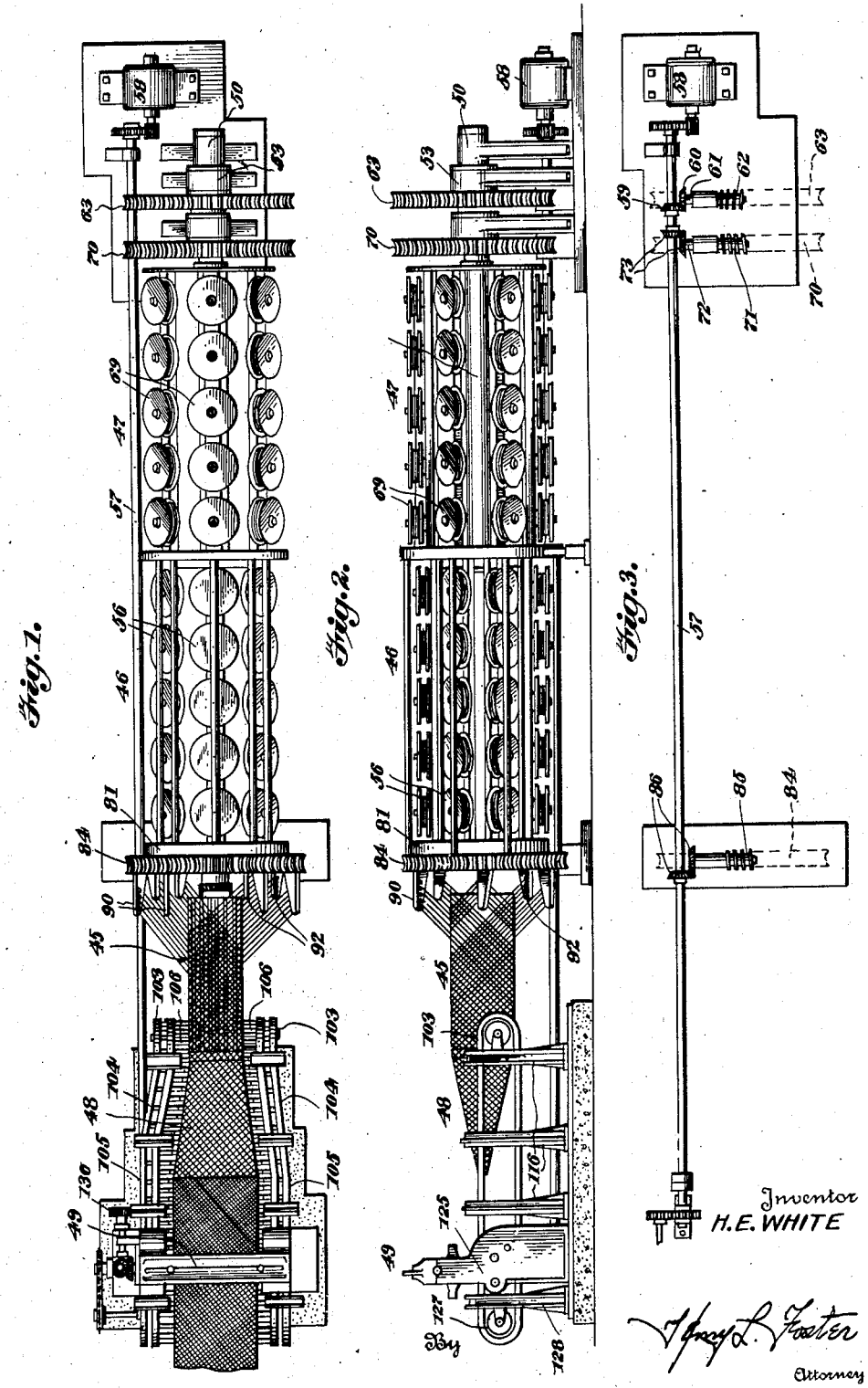
Inventor
H. E. WHITE
By Henry L. Foster
Attorney

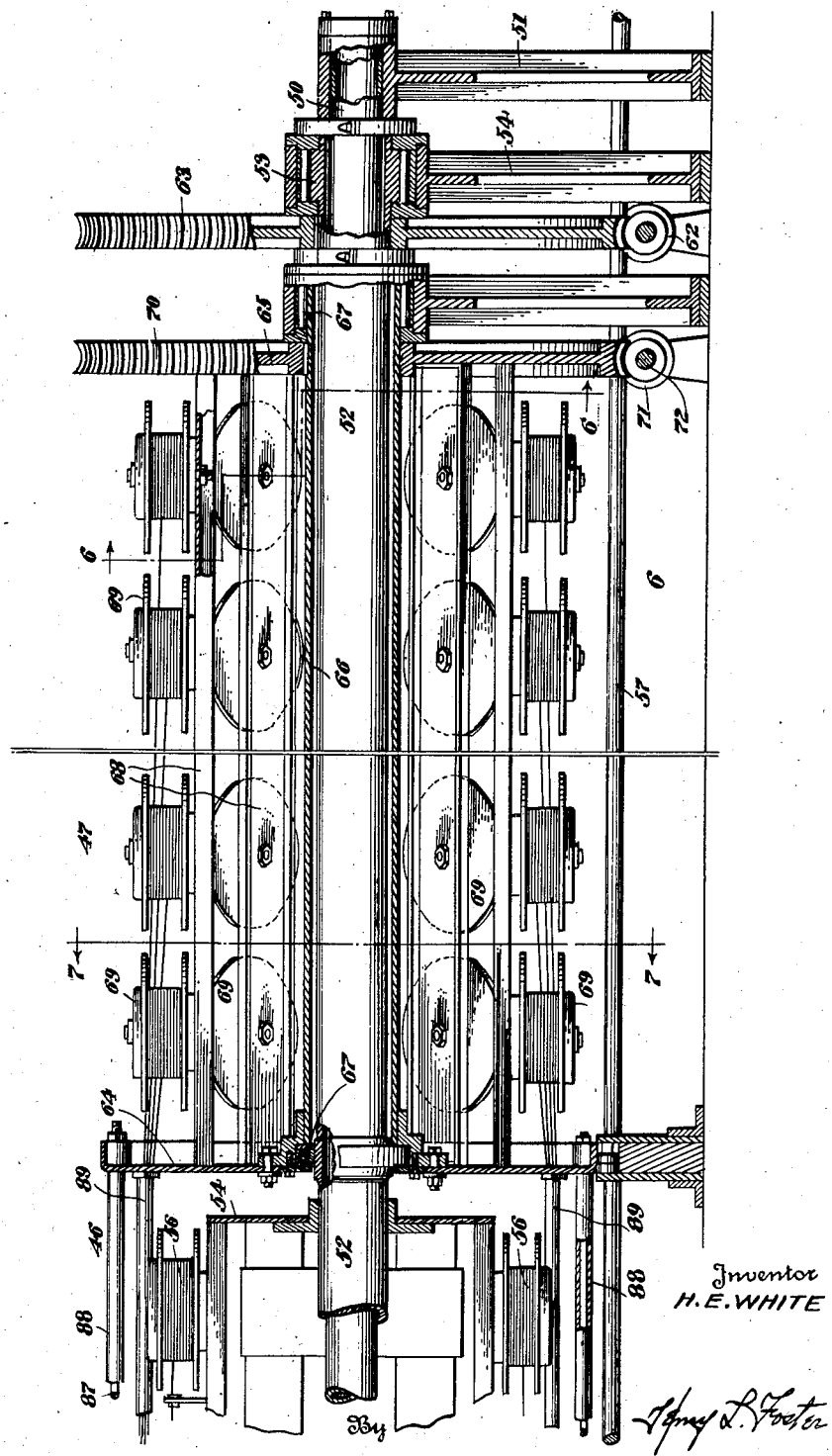

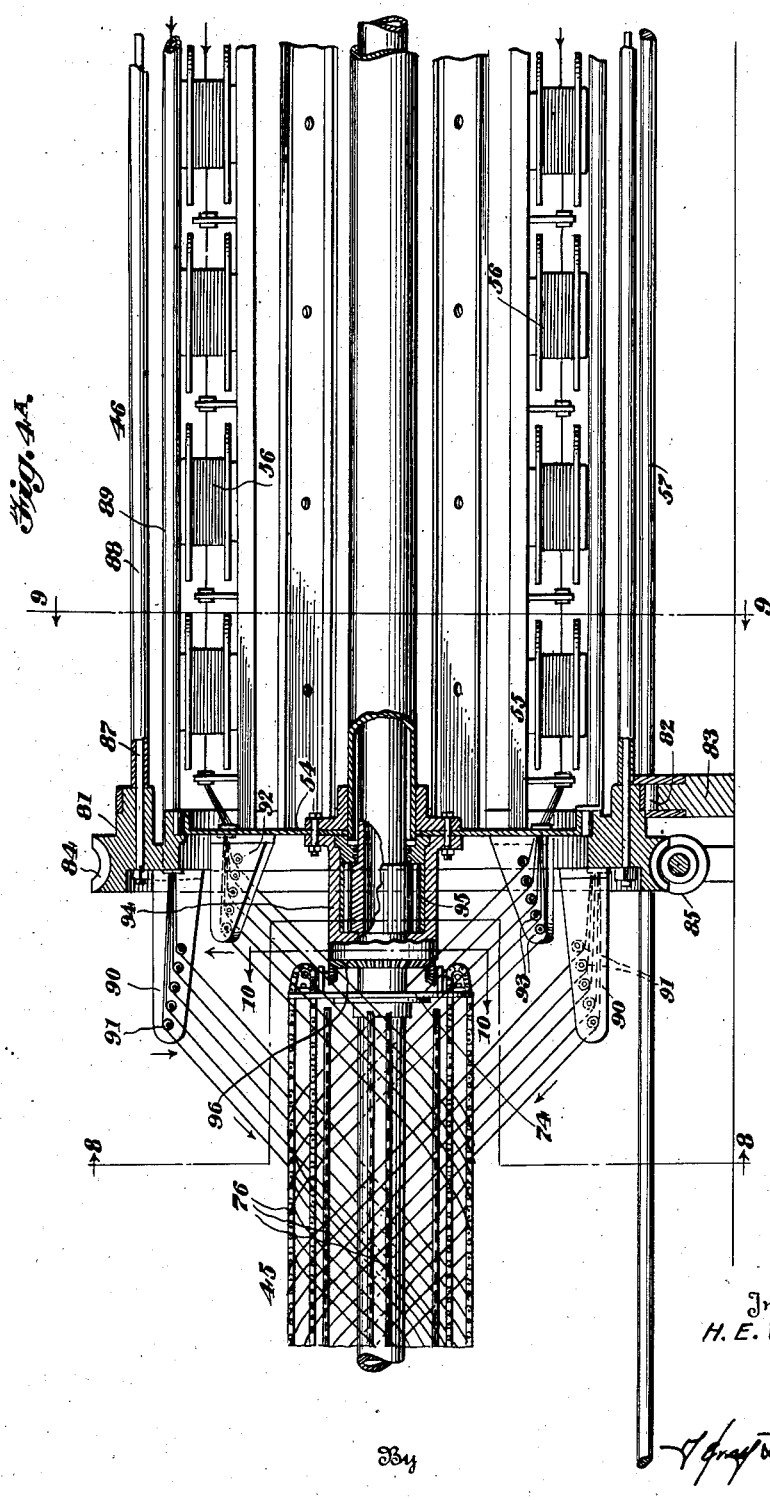

Dec. 13, 1938.  H. E. WHITE  2,140,488
APPARATUS FOR MAKING WIRE MESH
Filed April 20, 1936  15 Sheets-Sheet 4
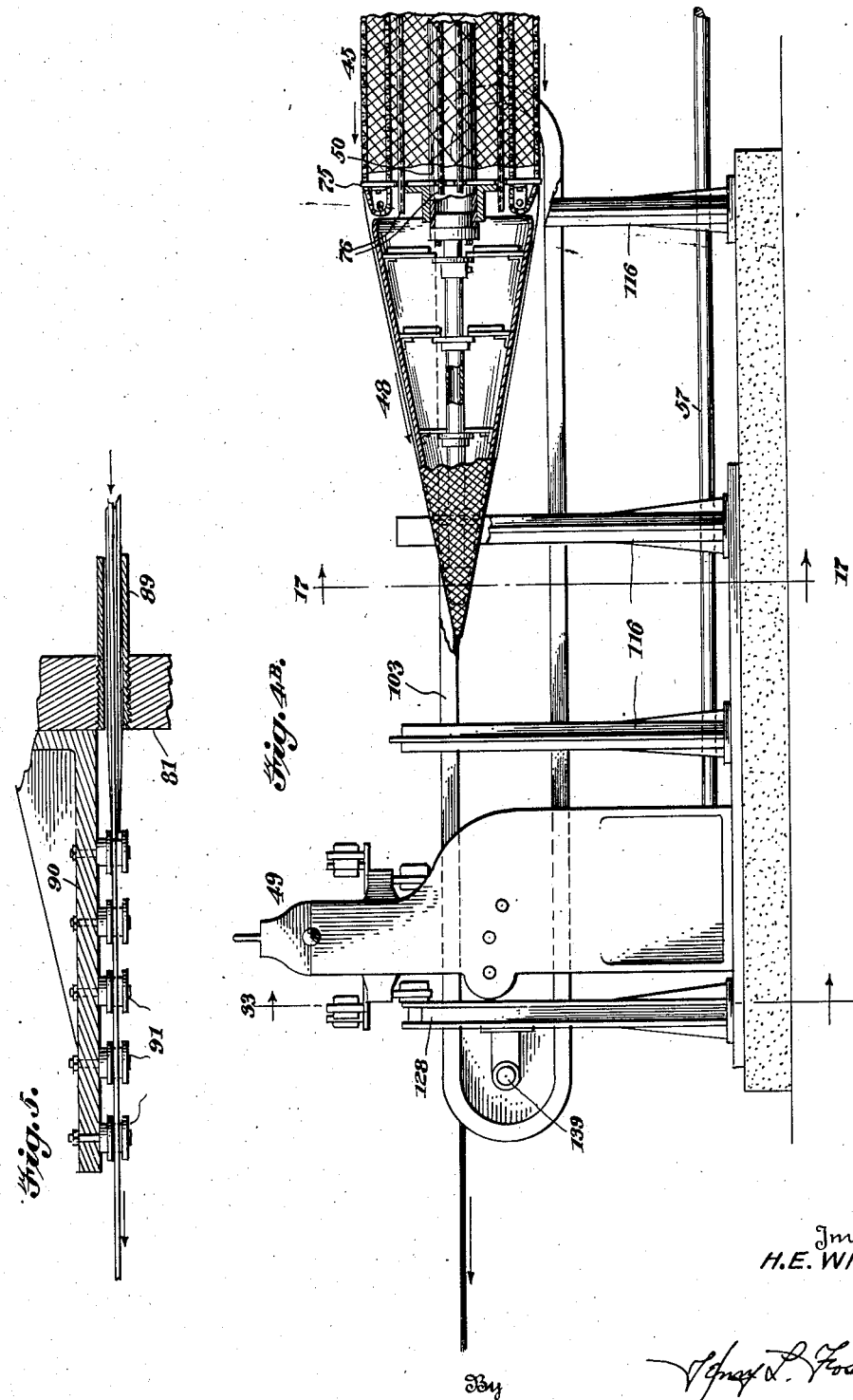
Inventor
H. E. WHITE

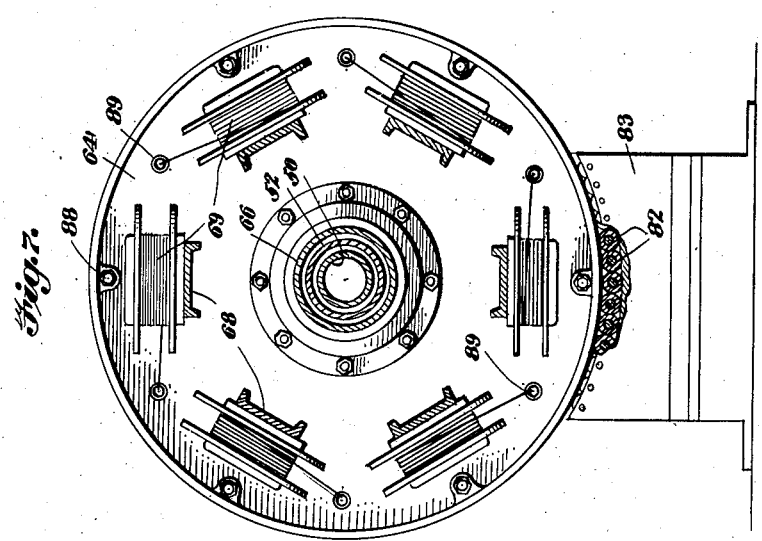
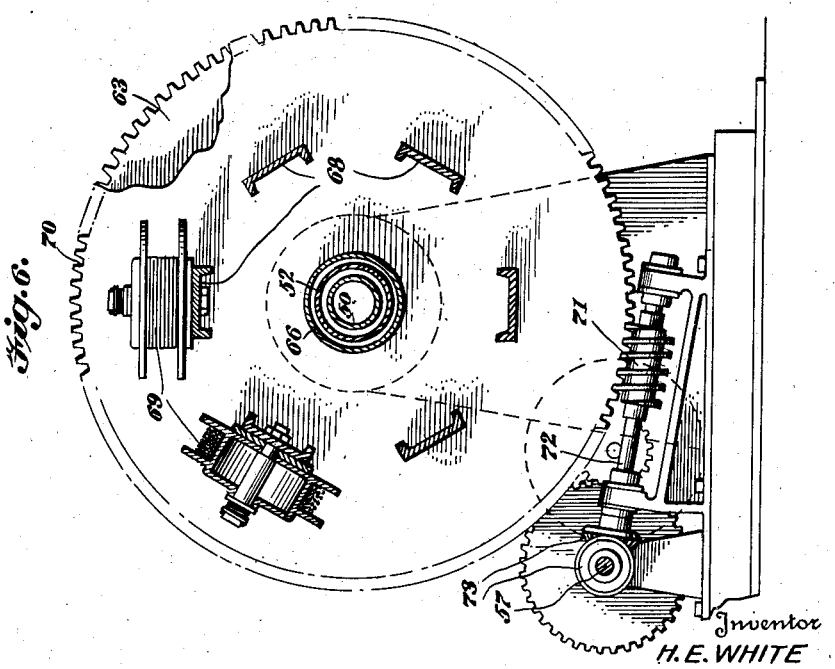

Dec. 13, 1938.   H. E. WHITE   2,140,488
APPARATUS FOR MAKING WIRE MESH
Filed April 20, 1936   15 Sheets-Sheet 6

Inventor
H. E. WHITE

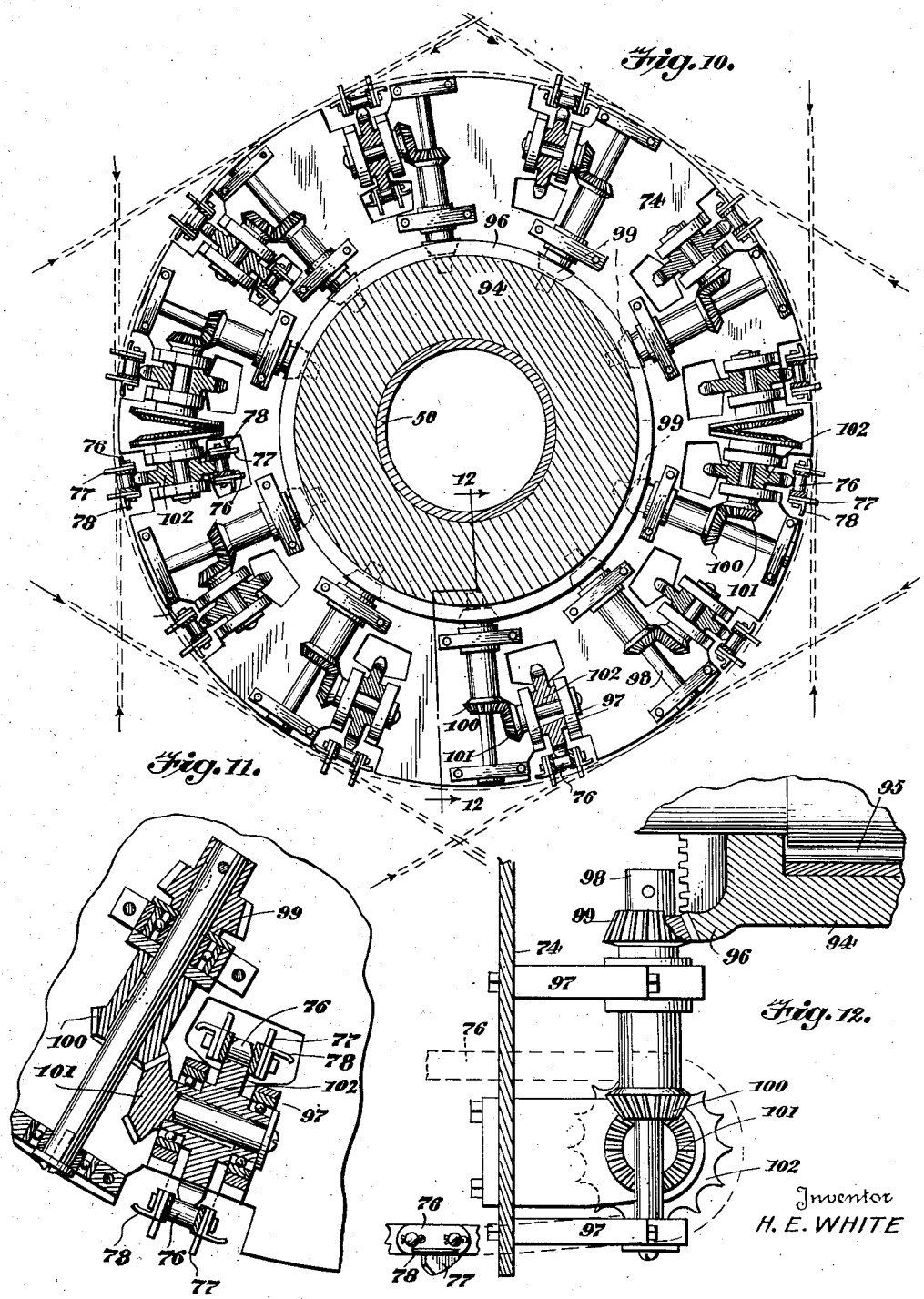

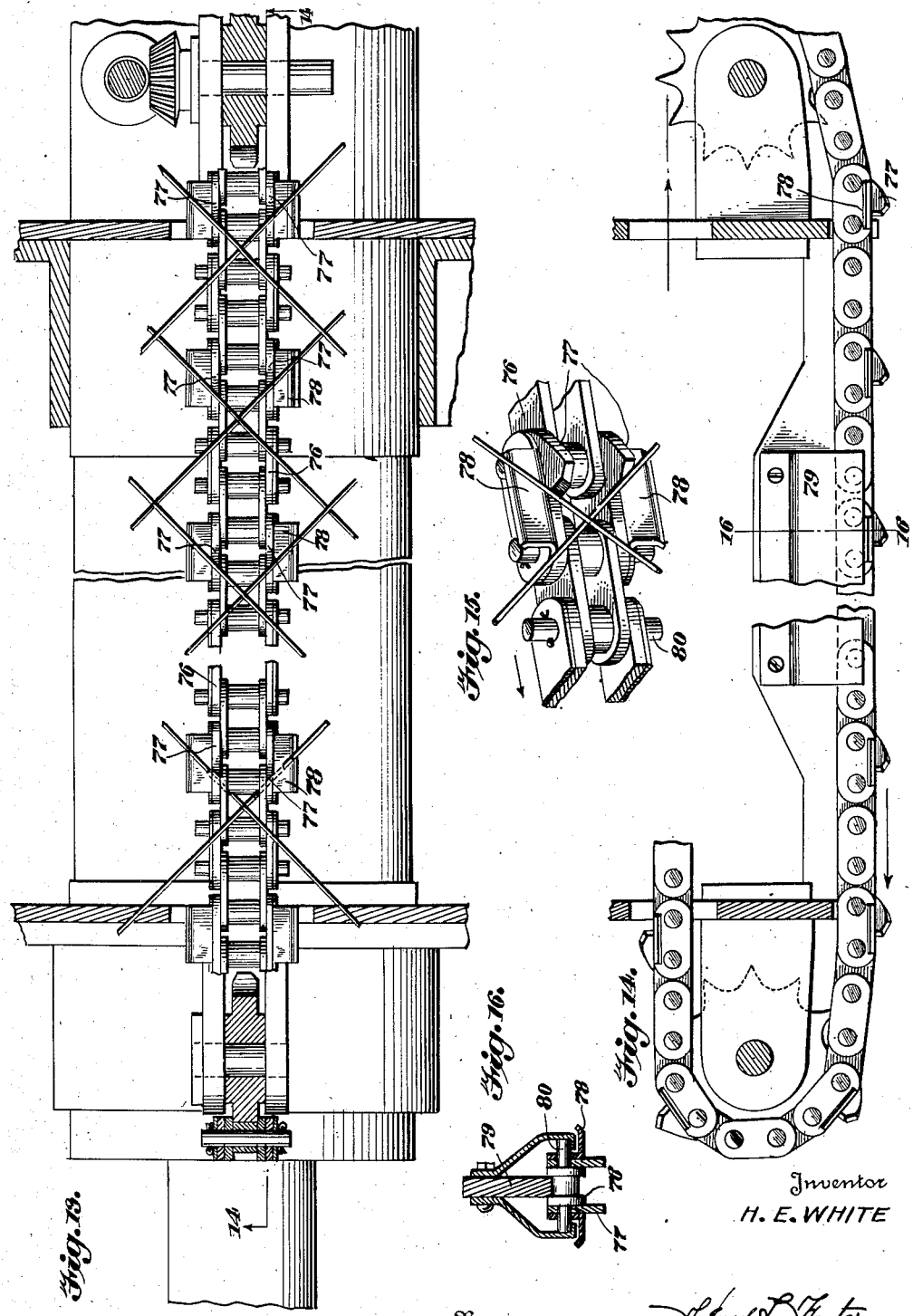

Dec. 13, 1938.                H. E. WHITE                2,140,488
                     APPARATUS FOR MAKING WIRE MESH
                  Filed April 20, 1936        15 Sheets-Sheet 9
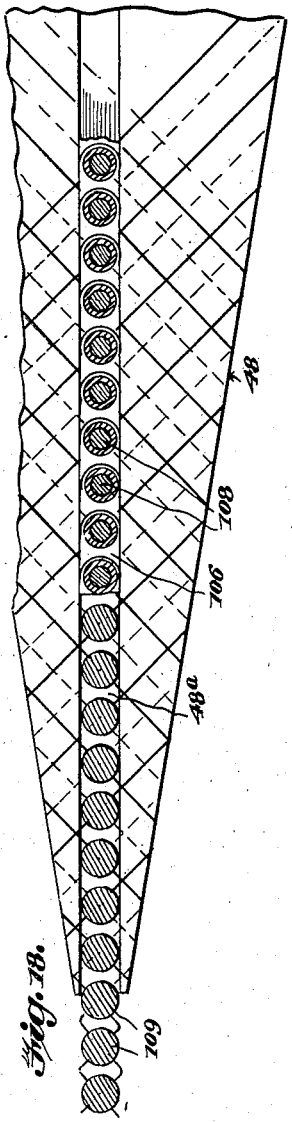
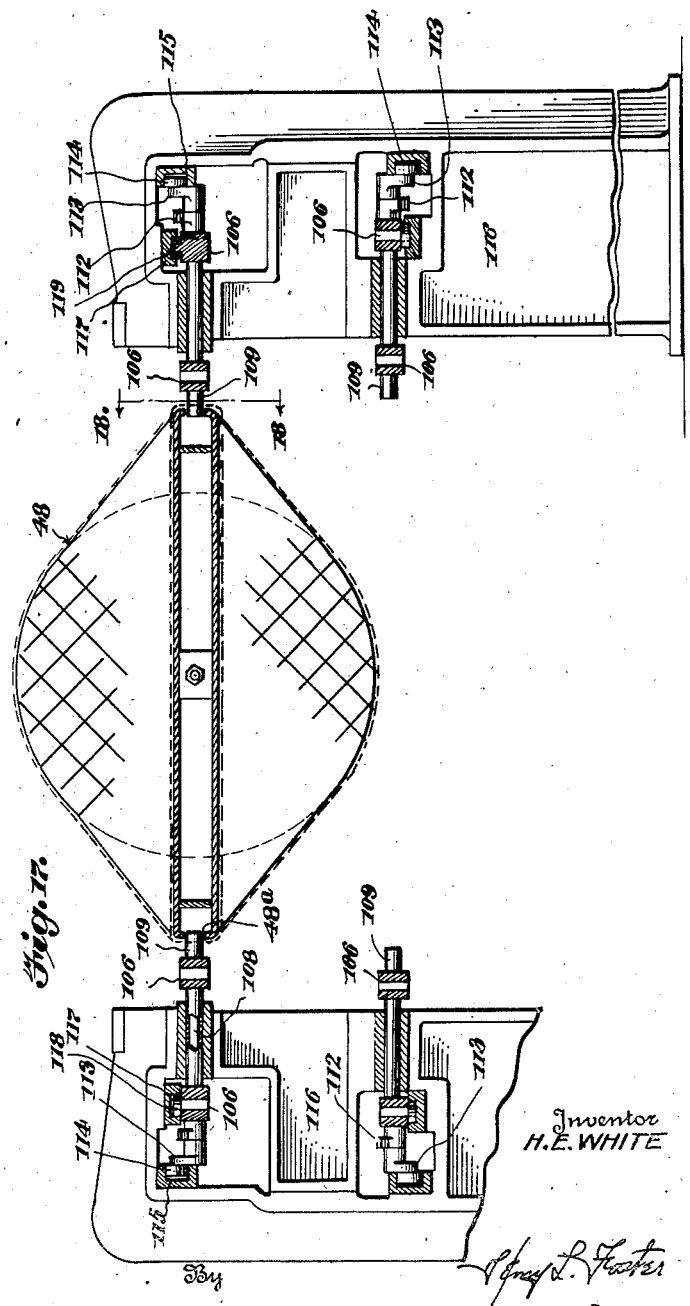
Inventor
H. E. WHITE

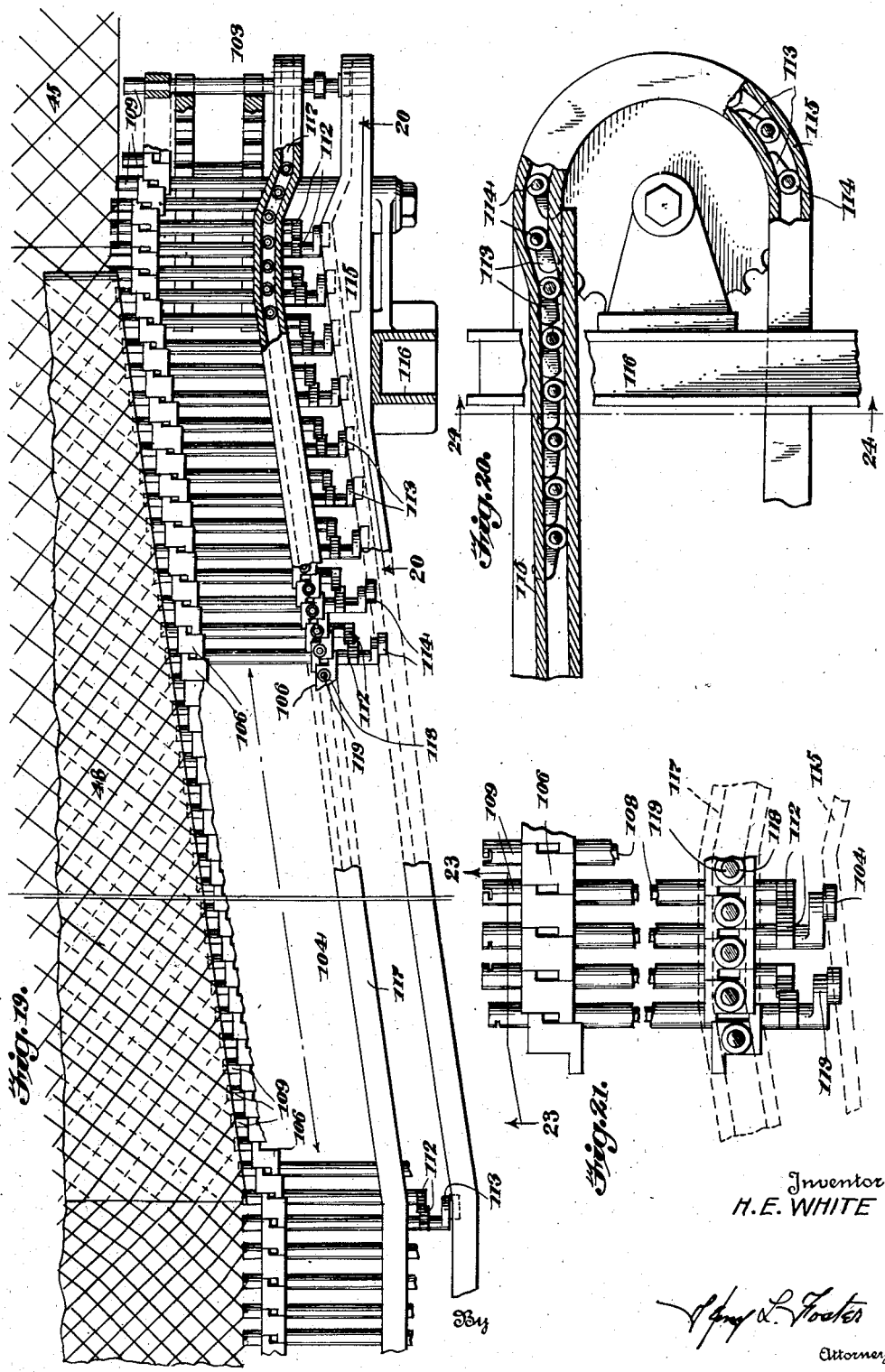

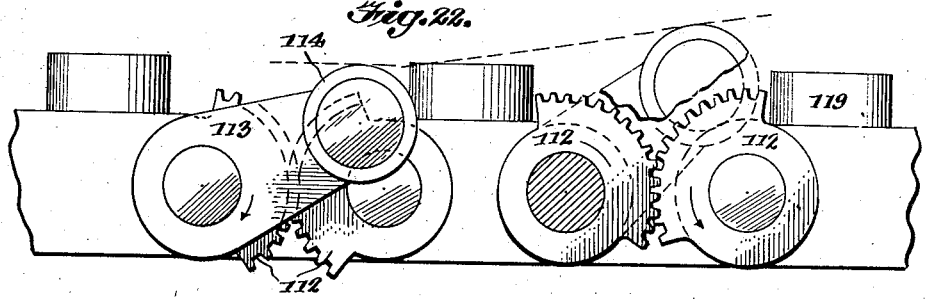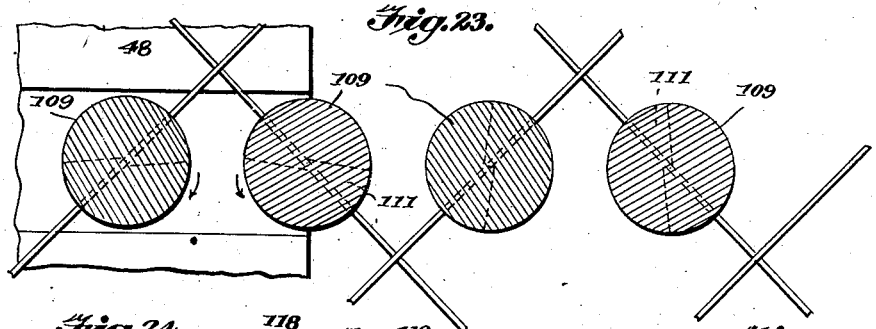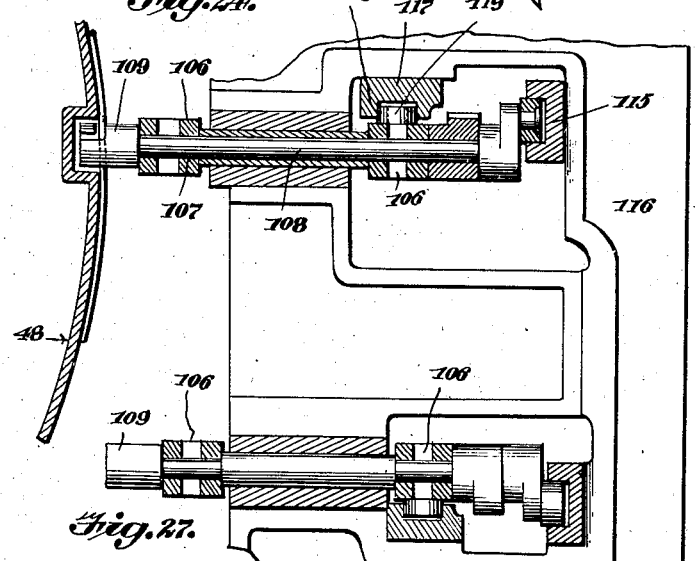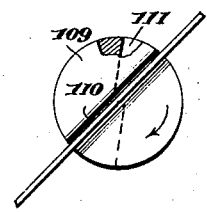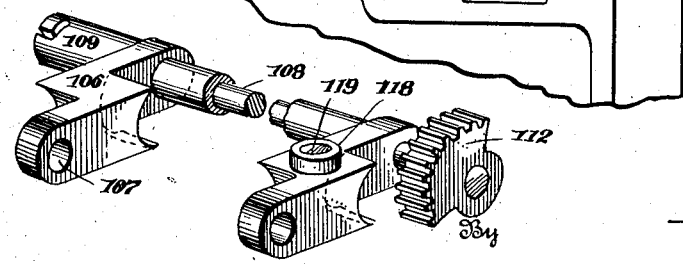

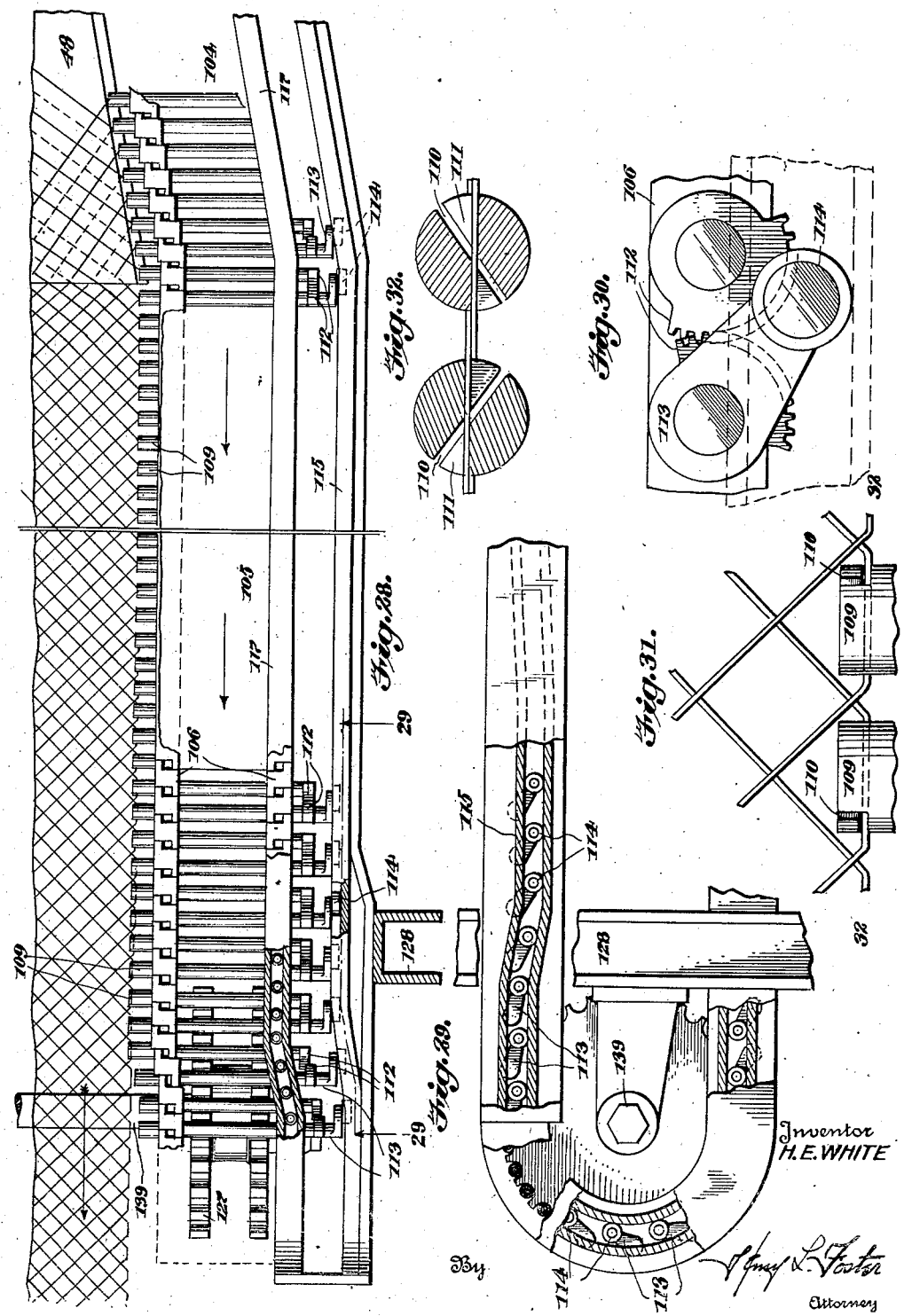

Dec. 13, 1938.                H. E. WHITE                2,140,488
                    APPARATUS FOR MAKING WIRE MESH
                    Filed April 20, 1936        15 Sheets-Sheet 13
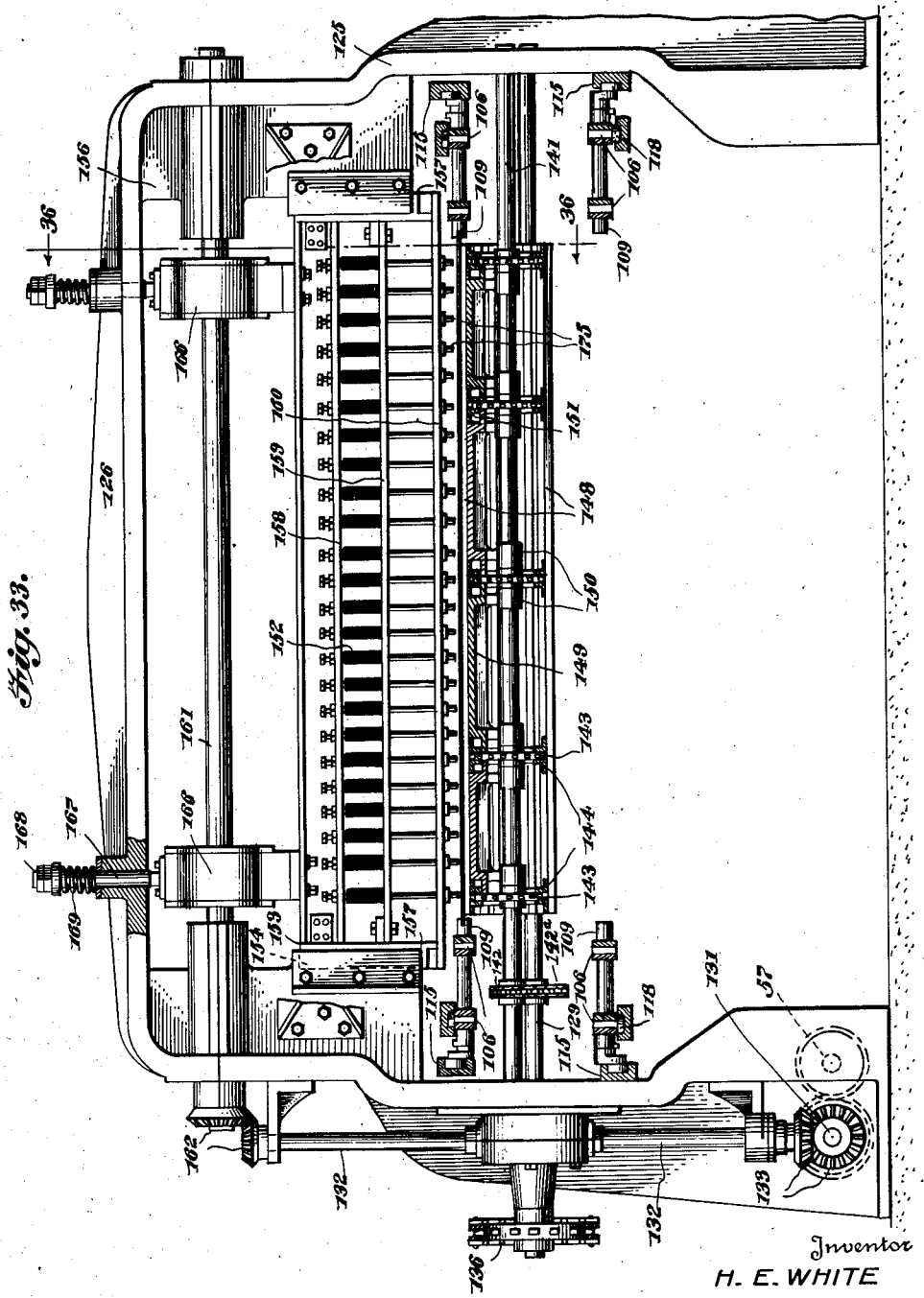
Inventor
H. E. WHITE Dec. 13, 1938.  H. E. WHITE  2,140,488
APPARATUS FOR MAKING WIRE MESH
Filed April 20, 1936  15 Sheets-Sheet 14
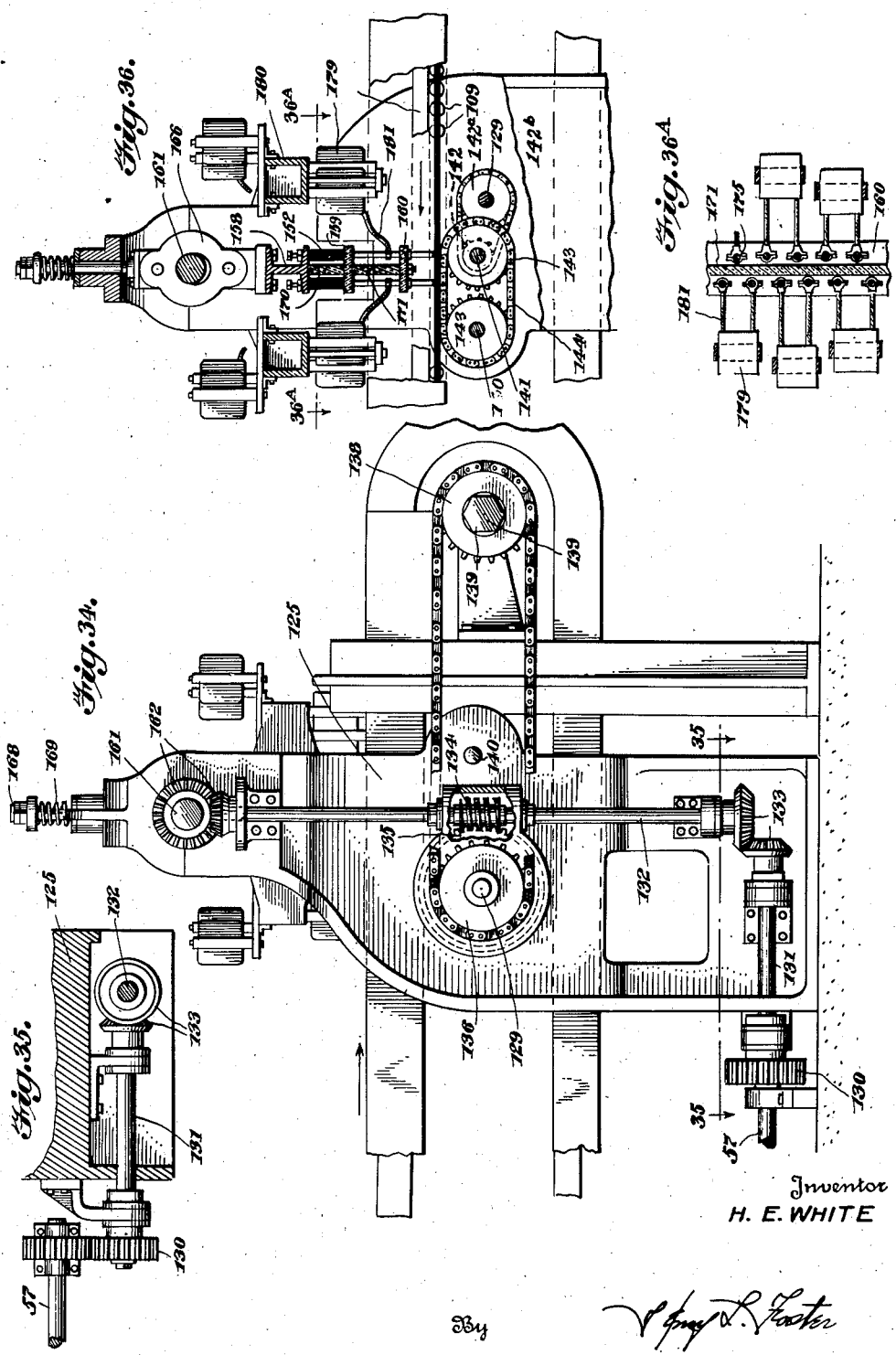
Inventor
H. E. WHITE Dec. 13, 1938.  H. E. WHITE  2,140,488
APPARATUS FOR MAKING WIRE MESH
Filed April 20, 1936   15 Sheets-Sheet 15
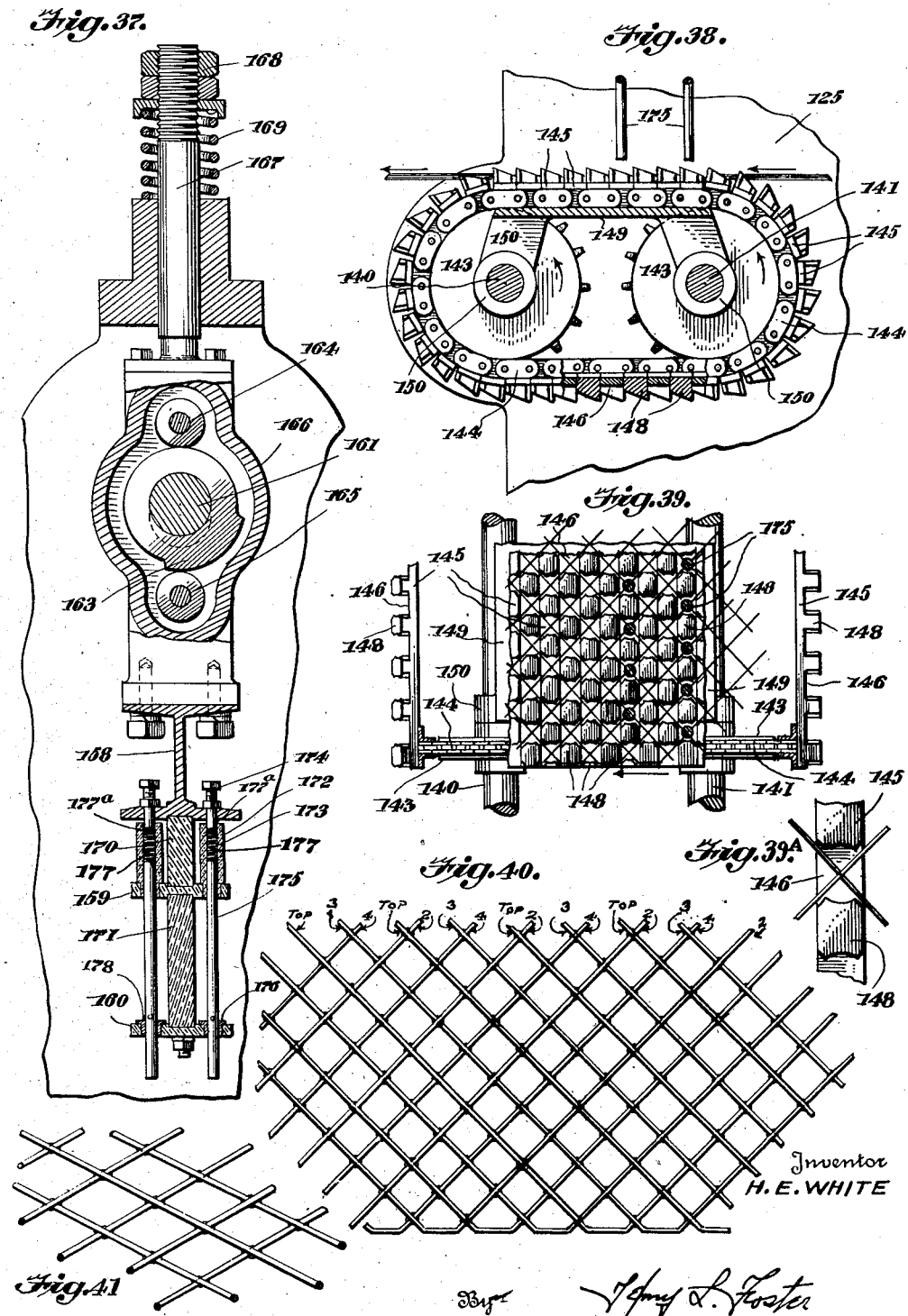

Patented Dec. 13, 1938

2,140,488

UNITED STATES PATENT OFFICE 2,140,488

APPARATUS FOR MAKING WIRE MESH

Herbert E. White, San Francisco, Calif., assignor to E. H. Edwards Company, a corporation of California Application April 20, 1936, Serial No. 75,488

38 Claims. (Cl. 140—112)

The present invention relates to apparatus for producing open mesh fabric of crossed strands, and particularly wire strands which are in continuous lengths.

The object is to provide an apparatus of a simple and effective character that will produce such fabric accurately and very expeditiously, the resultant sheet having peculiar characteristics that make it exceptionally strong.

Reference is made to divisional application, Serial Number 110,745 and application Serial Number 190,068 that describe and claim respectively the method of manufacturing wire mesh that is performed, and the product produced by the apparatus disclosed by this application.

In the accompanying drawings:

Figure 1 is a plan view of an embodiment of the invention which is at present considered the preferable one.

Figure 2 is a side elevation of the same.

Figure 3 is a plan view of the main driving mechanism.

Figures 4, 4A and 4B together constitute a vertical longitudinal sectional view (with parts in elevation) on an enlarged scale of the complete machine.

Figure 5 is a detail longitudinal sectional view of one of the strand-laying arms.

Figures 6 and 7 are respectively cross sectional views taken on the lines 6—6 and 7—7 of Figure 4.

Figure 8:
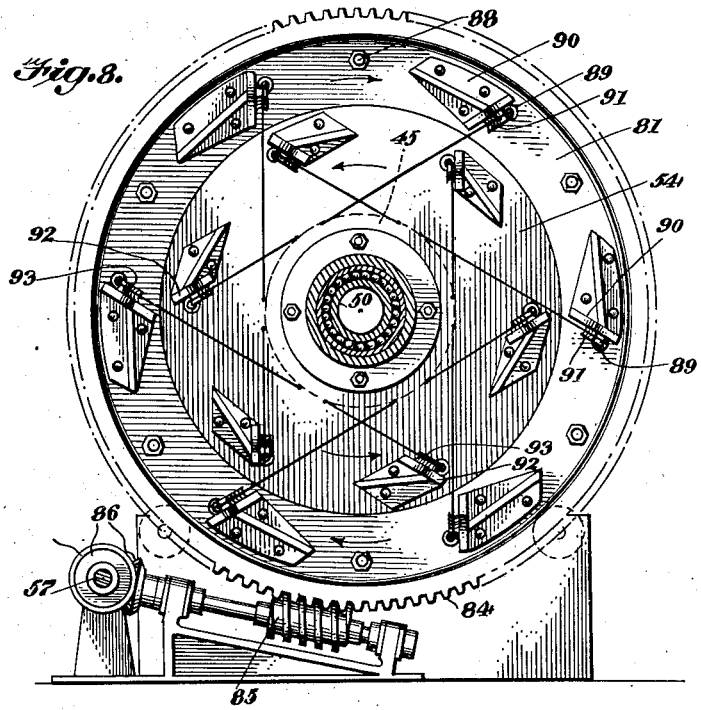
Figure 9:
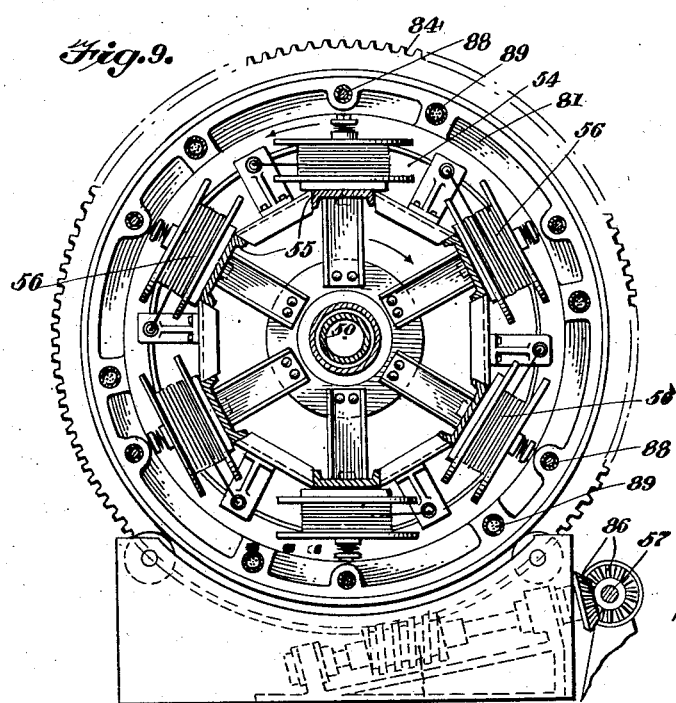

Figures 8, 9 and 10 are cross sectional views respectively on the lines 8—8, 9—9 and 10—10 of Figure 4A.

Figure 11 is a detail sectional view of one of the driving mechanisms for a mandrel conveyor.

Figure 12 is a detail sectional view on the line 12—12 of Figure 10.

Figure 13 is a detail side elevation of a part of the body-forming mandrel, showing one of the conveyors in elevation and the driving mechanism in section.

Figure 14 is a longitudinal sectional view on the line 14—14 of Figure 13.

Figure 15 is a detail perspective view of a portion of one of the conveyor chains illustrating the means for engaging and moving the tubular body along the mandrel.

Figure 16 is a detail cross sectional view on the line 16—16 of Figure 14.

Figure 17 is a cross sectional view on the line 17—17 of Figure 4B.

Figure 18 is a longitudinal sectional view on the line 17—17 of Figure 17.

Figure 19 is a plan view of a portion of the discharge end of the mandrel and one of the conveyors that operates alongside the same.

Figure 20 is a vertical sectional view on the line 20—20 of Figure 19.

Figure 21 is a detail plan view of a portion of one of the holding and stretching conveyors.

Figure 22 is a side elevation on an enlarged scale of the mechanism shown in Figure 21, with a portion in section.

Figure 23 is a detail sectional view on the line 23—23 of Figure 21.

Figure 24 is a vertical cross sectional view on the line 24—24 of Figure 20.

Figure 25 is an end elevation of one of the strand-holding heads showing the same in position to receive a strand.

Figure 26 is a view similar to Figure 25, but illustrating the head turned to a position to interlock with the strand.

Figure 27 is a perspective view of a portion of the holding and stretching conveyor, showing one of the stems and its holding head.

Figure 28 is a view similar to Figure 19, but showing the extension of the holding and stretching conveyor beyond the same.

Figure 29 is a vertical longitudinally sectional view on the line 29—29 of Figure 28.

Figure 30 is an outside end elevation of the operating means for a pair of holding stems.

Figure 31 is a detail plan view illustrating how the holding heads interlock with the selvage of the fabric.

Figure 32 is a sectional view on the line 32—32 of Figure 31.

Figure 33 is a vertical cross sectional view on the line 33—33 of Figure 4B, showing the welding mechanism in elevation.

Figure 34 is a side elevation of the welding mechanism.

Figure 35 is a plan view of the driving mechanism for the welder operating from the main drive shaft.

Figure 36 is a vertical sectional view on the line 36—36 of Figure 33.

Figure 36a is a sectional view taken on the line 36a—36a of Figure 36.

Figure 37 is an enlarged sectional view of the top structure of the welder.

Figure 38 is an enlarged side elevation partly in section of the lower contact device of the welder unit.

Figure 39 is a broken plan view of the lower contact device of the welder unit.

Figure 39a is an enlarged view of a portion of one of the contact bars.

Figure 40 is a plan view of a section of fabric produced by the machine.

Figure 41 is a perspective view of a portion of the fabric.

The machine of the invention as herein disclosed is intended to provide a continuous length of open mesh fabric made up of a plurality of layers, each of which is interrelated with each of the other layers, and the whole fabric having selvage edges which edges are common to all of the layers. The strands making up the fabric, extend back and forth in unbroken continuity, and each strand forms a part of more than one layer, the strand changing back and forth from one layer to another with each change of direction at the selvage edges. Each of the strands is secured to each of the other strands at the crossing points, the results being that the fabric is secured into a single unitary structure.

Referring first to the general views, Figures 1, and 2, a body-forming mandrel 45 is employed, at one end of which are two carrier drums designated 46 and 47 respectively, which delivers sets of strands to the mandrel on which said strands are wrapped in opposite directions to form coils. The opposite end of this mandrel to the carrier drums 46 and 47 is tapered and flared, as illustrated generally at 48, and means are provided for collapsing the tubular body formed on the mandrel 45, and stretching it laterally into a double walled sheet which is carried through a welding apparatus 49 that welds the various strands at their crossing points and thus produces the finished fabric.

Considering now more particularly the structure as shown in greater detail in Figures 4, 4A and 4B, a central spindle or axle 50 is fixedly mounted at one end in a suitable standard 51 and extends through the carrier drums and to the end 48 of the mandrel 45. On this drum is journaled a tubular shaft 52 having bearings at 53 in another standard 54 adjacent to the standard 51. This shaft has fixed to it the drum 46 that is directly adjacent to the receiving end of the mandrel 45, and has an axis of rotation coincident with the axis of said mandrel. As shown the drum 46 consists of heads 54 connected by tie bars 55, and on said bars are mounted sets of strand-holding magazines in the form of wire-holding spools 56, five being shown in each set and there being six of said sets, though the number can of course be altered if desired. The drum 46 is rotated from a main drive shaft 57 (see Figures 1 and 3), which extends longitudinally alongside the lower portion of the machine and may be driven in turn by a motor 58 suitably geared thereto. On this shaft is fixed a bevel gear 59 meshing with another bevel gear 60 on a transverse stub shaft 61. The stub shaft carries a worm 62 that is in mesh with a large worm gear 63 fixed to the tubular driving shaft 52 on which the drum 46 is mounted.

The drums 46 and 47 are in tandem relation, and as shown are on a common axis. The drum 47 consists of spaced heads 64 and 65 carried by another tubular shaft 66 that is journaled, as shown at 67 on the tubular shaft 52. The heads 64 and 65 are connected by tie bars 68 that also carry strand-holding magazines in the form of sets of spools 69 arranged like the spools 56. This drum 47 is rotated in a direction opposite to that of the drum 46, and for this purpose the head 65 is in the form of a worm gear 70 engaged by a worm 71 on a transverse shaft 72 that is geared as shown at 73 to the main drive shaft 57.

Referring now to the mandrel 45, and particularly to Figures 4A and 4B the same is generally of skeleton formation, having spaced heads 74 and 75 on which are mounted a series of endless conveyor chains 76 whose outer stretches move away from the drums and form in effect a tubular structure. These conveyor chains are provided at intervals with sets of outstanding lugs 77 that engage behind the strands to move the same along the mandrel. At the base of these lugs 77 are stop or guide plates 78 on which the strands ride. The bottom chain of the set is shown more particularly in Figures 14 and 16 and has its outer stretch preferably supported by guides 79 on which the outstanding stems 80 of the chains run, thus preventing the downward sagging of this particular conveyor.

Referring now back to Figures 1, 2, 4 and 4A, it will be noted that between the end of the drum 46 and the mandrel 45 there is journaled a ring member 81, the supporting bearing 82 of which is in the form of a cradle 83. This ring has its periphery in the form of a worm gear 84 driven by a worm 85 that is geared, as shown at 86, in Figure 3, to the main drive shaft 57. The rotation of the ring 81 is in the same direction as is the drum 47 and it is connected thereto by tie bolts 87 on which are spacer sleeves 88. The ring 81 is also connected to the head 64 by tubular guides 89 that are open-ended, and through each of which slidably pass the wires or strands from one of the sets of spools 69.

Secured to the ring 81 and projecting longitudinally over the adjacent end of the mandrel 45 is a series of strand-laying arms 90, each having a set of guide rollers or other suitable devices 91 over which the strands or wires issuing from the tubes 89 pass. The head 54 of the drum 46, which lies substantially within the ring 81, carries other strand-laying arms 92 that have guide rollers 93, over which the strands or wires issuing from the spools 56 pass, each arm preferably acting upon the wires coming from one of the sets of spools.

The operation of the apparatus as thus described is as follows: As the two spool-carrying drums are rotated in opposite directions, and one set of laying arms 92 has a path inside the path of the other set and said arms rotate in opposite directions, it will be clear that each arm wraps around the mandrel a plurality of strands in the form of continuous coils, those of one set of arms, as 92, laying these strands upon the conveyor in one direction and the other arms 90 laying a set of the strands in an opposite direction on the conveyor from the first set, the strands being spaced apart.

A different type of fabric may be manufactured by rotating the spool carriers in the same direction, or by using a single carrier. The fabric resulting from this operation will not have interwoven strands, but all of the strands on one side will run in one direction and all of the strands running in the other direction will be on the other side of the fabric.

As these strands are laid, the outer stretches of the conveyors 76 are continuously moving along the mandrel 45 away from the laying arms. Consequently this continuously formed tubular body is continuously moving along the mandrel toward the discharge end of the same.

To effect the movement of the said conveyors 76 the mechanism shown in Figure 10 is preferably employed. The head 54 of the spool-carrying drum 46, as shown in Figure 4A has a tubular extension 94 fixed thereto and operating on a roller or other suitable bearing 95. This extension 94 terminates at its outer end in a large bevel gear 96. Journaled in brackets 97 fixed to the head 74 of the mandrel is a set of radial countershafts 98 having at their inner ends bevel gears 99 that are in mesh with the gear 96. These shafts also carry bevel gears 100 that are in mesh with transversely disposed bevel gears 101 having sprocket wheels 102 around which pass the conveyor chains 76.

In addition to the above described conveyor chains 76 there are provided on opposite sides of the mandrel 45 two special conveyors for engaging with the opposite sides of the tubular fabric body and causing the same to collapse and flatten out so that the upper and lower walls of said body will be brought together and thus the said body is changed into a sheet of open mesh fabric having continuous strands woven back and forth diagonally across the same.

As already explained the mandrel 45 has its delivery end tapering from above and below to a substantial transverse edge, and it is also flared to said edge. In other words, the said transverse end or edge is longer than the cross sectional diameter of the tubular portion of the mandrel. As the said tubular portion travels down this tapered part, it is caused to collapse and widen, the above mentioned special conveyors which are for the purpose of assisting in or effecting this operation, while they also hold the wires taut and in proper relation and carry the fabric forward. It is to be understood that one of these conveyors is on each side of the mandrel, and as they are preferably duplicates, a detail showing of one, it is believed, will be sufficient for both.

Referring first to Figure 1, it will be noted that these conveyors, designated generally by the reference numeral 103 extend from the discharge end of the mandrel 45, and have divergent portions 104 that operate parallel to the divergent sides of the tapered end 48 of the mandrel, and then extend in parallel relation, as shown at 105 through the welding apparatus 49.

Considering now in greater detail these conveyors, and referring to Figures 19 and 28 each employs two endless chains 106 located in spaced relation and operating in parallelism. The links of said conveyor chains are provided with guide openings 107 through which extend spindles 108 that are rotatable in said openings. Each spindle has at its inner end a head 109 provided with a transverse slot 110, into which the portion of a strand that is to form the selvage edge of the fabric sheet, is adapted to pass (see Figure 25). The portion of the head behind this slot is provided with a socket 111 that radially widens from the axis in both directions, so that the slot 110 constitutes an entrance throat thereto (see Figure 32). The spindles 108 are arranged in pairs and at their outer end are inter-connected by segmental gears 112 so that when one is turned in one direction, the other will be turned in the other direction. One of the spindles of each set is furthermore provided at its outer end with a crank arm 113 carrying a roller 114 that operates in a cam track 115 suitably supported on standards 116 ranged alongside the conveyors and so formed that at the rear ends of the conveyors they will hold the spindles so that the slots 110 in the head aline with the wires.

The inner ends of the spindles 108 engage in runways or tracks 48a in the side of the mandrel 48, the track serving as a guide and also permitting the spindles to move far enough so that the wires are securely engaged in the slots.

In order to draw the edges of the tubular fabric out to flatten it as it moves forwardly the spindles 108 are moved rearwardly as they progress with the fabric. This is accomplished by means of a cam track 117 that is parallel to the cam track 115 and in which run rollers 118 mounted on pins 119 that extend vertically from the links of the chains 106. Their operation is to cause spindles 108 to move inwardly or outwardly through the guide openings 107.

These conveyors and cam tracks are so arranged that at the discharge end of the mandrel 45, just in advance of the tapered portion 48, the spindles are moved inwardly, as illustrated in Figure 24, so that the strand wires will enter the slots 110, after which the cam track 115 is so offset that the spindles successively will be caused to turn from the position shown in Figure 25 to the position shown in Figures 26 and 32. The strands will thus be locked in the heads because they are now out of alignment with the slots 110. Therefore it will be evident that as the interlocked spindles travel along the divergent portions 104 of the conveyor which is alongside the tapered portion 48 of the mandrel, the upper and lower walls of the tubular fabric, will be stretched laterally outward and the tubular body collapsed into substantially flat form, with the upper wall lying on the lower wall. In connection with this the strands have been so laid on the mandrel that when one wall is brought down upon the other, the crossed strands of the upper layer will lie between the crossed strands of the lower layer, and thus the tubular body, which initially was of a really coarse or large mesh, has been transformed into a sheet with a mesh of half the size. The strands moreover are continuous so that the selvage is formed by the looped portions. In other words each strand runs back and forth continuously through the different layers.

The sheet as thus assembled is next passed through the welding apparatus 49, where preferably the wires at their crossing points are welded together. While it may not be necessary to weld each cross, this may be readily accomplished, but whether each is done or whether some are left free, the crossed wires of each of the two main layers are welded together and the crossed wires of the two layers are welded each to the other, so that the individual layers of each main layer are thus secured together and the two main layers are also welded together. As a consequence the product has normally interwoven strands welded together.

The welding mechanism preferably employed is as follows:

A main frame composed of spaced side walls 125 and a top wall 126 is positioned beyond the discharge end of the mandrel 45. The conveyors 103 pass through the welding apparatus adjacent the side walls 125, the chains 106 passing about wheels 127 mounted on a suitable supporting structure 128 mounted beyond the welder.

The cam track 115 is arranged to release the edges of the fabric from the slots and the ends of the spindles 108 as they approach the wheels 127, the fabric being completed at that time.

Transversely mounted between and journaled in suitable bearings in the side walls 125 is a main cross shaft 129 that is also located between the flights of the chains 106. The main drive shaft 57 of the machine through pinions 130 drives a jack shaft 131, which in turn drives a vertical shaft 132 on the outside of the wall 125, by means of bevel gears 133. The main cross shaft 129 is driven from the vertical shaft 132 by a worm 134 on the latter and engaging a worm gear 135 mounted on the former.

A sprocket wheel 136 is mounted on the end of the main cross shaft 129 and by means of a sprocket chain 137 and sprocket wheel 138 mounted on a cross shaft 139 supported on the structure 128 and upon which the wheels 127 may also be mounted, which drives the chains 106 of the conveyors 103.

Welding contacts for the lower sides of the joints of the wire strands are provided as follows: Two cross shafts 140, 141 are journaled between the side walls 125 of the machine and located between the flights of the chains 106. The shaft 141, which is toward the intake end of the welder is driven from the main cross shaft 129 by means of a sprocket 142 mounted thereon, a sprocket 142a mounted on the main shaft of a sprocket chain 142b. Each of the shafts 140, 141 carries a plurality of sprocket wheels 143 preferably equally spaced throughout a portion of its length approximately equal to the fabric and located beneath the path of the fabric.

Chains 144 pass about the sprocket wheels 143 on the shafts 140 and 141, these chains carrying between them and mounted upon their outer surfaces a plurality of copper cross bars 145 that act as contacts for the welding operations, and that are spaced to register with each succeeding row of crossing points in the fabric as the operation progresses.

The copper bars 145 have specially formed tops to engage the meshes of the fabric. Each bar has a plurality of spaced sockets 146 (see Figure 39) for the reception of electrodes, as will be later described, and angular channels 147 for the accommodation of the strands between the sockets and the edges of the bars. As each bar comes into position beneath a row of the crossings of the wires, the joints are received in the sockets 146, while the higher portions 148 of the bars extend up through the meshes. This structure serves to positively position the joints to be welded beneath the electrodes. It is to be noted that the sockets in adjacent bars bear a staggered relation due to the pattern of the mesh crossings.

In order to provide a firm support for the welding operation, a table is provided upon which the copper bars 145 move as they progress forwardly. The table consists of a plurality of plates 149 supported by brackets 150 mounted upon the shafts 140 and 141. The chains 144 run in channels 151 between the plates and the bottoms of the upper flight of bars rest on the tops of the plates.

An electrode supporting frame 152 is mounted for vertical reciprocation in the frame of the welder. This frame has side members 153 including outwardly extending flanges 154 that engage in guides 155 mounted on flanges 156 of the side walls 125. The side members may be provided with suitable stops 157. Between the side members 153 and mounted thereon are three cross members 158, 159 and 160 located one below the other. The upper member 158 may advantageously be in the form of I beams. The lower members 159, 160 are of non-conducting material.

To reciprocate the electrode frame, a cam shaft 161 is mounted above the frame and journaled in the side walls 125. The cam shaft is driven through bevel gears 162 from the vertical shaft 132. Cams 163, having each a single projection, are mounted on the shaft 161, and they operate against rollers 164 and 165 mounted respectively above and below the cams in a casing 166. The bottom of each casing 166 is secured to the top flange of the upper member 158 of the electrode frame; and the top member bears a vertical guide rod 167 passing through a guide in top wall 126 of the frame, the end of the rod 167 being provided with a cap structure 168 cooperating with a compression spring 169. It will be appreciated that the operation of shaft 161 will cause the frame to be lowered at intervals by the cam, the frame being normally in raised position by the action of the springs 169.

Electrodes are supported by the frame in the following manner. The horizontal members 158, 159 and 160 are spaced by centrally located walls 170 and 171 respectively, which are composed of insulating material. On each side of the wall 170 and having centers spaced a distance equal to the center spacing of the meshes of fabric are rows of sleeves 172 of insulating material, such as fibre, and having central bores 173. The lower ends of the sleeves are engaged in openings of the middle transverse members 159. The sleeves on one side are staggered with relation to those on the other side and they are so located as to provide registration of the electrodes which they hold with the sockets 146 of the copper bars 145. Set screws 174 passing through the lower flange of the upper transverse member 158 have downwardly extending ends entered into the central bores.

The electrodes 175 are in the form of elongated rods, the upper ends of which are received in the bores 173 of the sleeves 172. The electrodes extend downwardly through the transverse member 160, preferably through bushings 176. The set screws 174 serve to adjust the pressure on coil springs 177 that are interposed between the ends of the set screws and the ends of the electrodes. Insulating disks 177a are interposed between the springs and the ends of the set screws. Stop members, such as the cross pins 178, are provided to prevent the electrodes from falling out when the electrode frame is raised.

Current is supplied to the electrodes from a plurality of transformers 179 mounted on suitable cross supports 180. The secondary coils of these transformers are provided with flexible lead wires 181, the lead wires from each transformer being connected to two adjacent electrodes. The path of the current is from one electrode through the joint to be welded, the top of which is engaged by the electrode, to the copper bar through which it flows to the other electrode, thus welding both adjacent joints.

The operation of the welder unit is as follows, it being understood that all gearing is so arranged as to produce proper synchronization of parts. The flattened fabric, conveyed by the chains 106 from the mandrel is brought into engagement with the copper bars 145 of the chains 144, and the meshes are received in the sockets 146. As the movement of the fabric continues, a row of strand crossings is brought beneath each bank of electrodes. As shown in Figure 39 there are two rows of crossings between the electrode banks, one having been already welded by the first bank, and the other being the next to be operated upon by the second bank.

When the strand crossings are in their positions the cam projection 163 will operate against the roller 165 to lower the electrode frame 152, bringing the electrodes into contact with the tops of the upper strands of the crossings positioned beneath them. The springs 177 are sufficiently strong to provide adequate pressure for efficient welding. A very brief period is sufficient to form strong welds, in fact it is so short that there is no necessity for interrupting the forward motion of the fabric, which is delivered from the discharge end of the welder, where it is released from the conveyors 103.

A section of the fabric manufactured by this machine is shown in plan in Figure 40, and in perspective in Figure 41. The strand labeled "Top" extends across the entire top of the fabric, crossing over each of the strands running in the other direction. When this strand reaches the edge, it follows the selvage for a short distance and then, as strand 4 recrosses the fabric on the bottom, and under all strands running in the other direction. The notations "Top", 2, 3, and 4 indicates the order of the strands from the top of the fabric downwardly. The wires making the strands "Top" and 4, are those that are wrapped on the outside of the tubular fabric formed on the mandrel. The strands 2 and 3 always lie between the strands "Top" and 4, each strand 2 crossing above the strand 3 and running parallel with the strands 4, and at each edge changing direction to become strand 3, parallel to strands "Top" and running beneath the strands 2.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In apparatus for making open mesh fabric, mechanism for forming a plurality of layers, of reticulated material, the said mechanism for forming each layer comprising devices for laying sets of strands, the strands of one set crossing those of the other and each layer being composed of the same sets of strands that form another layer, means for causing the said layers to lie one upon the other with the strands in crossed relation to and between the strands of the other layer, and means for securing the strands of one layer to the strands of the other layer at their crossing points.

2. In apparatus for making open mesh fabric, mechanism for forming spaced layers of reticulated material, each layer comprising sets of spaced parallel strands, the strands of the different sets of each layer being in crossed relation to those of the strands forming another set located in crossed diagonal relation to one another, means for bringing said layers together so that one will lie upon the other with each set of strands of one layer lying between and substantially parallel to one set of strands of the other layer and correspondingly crossing the other set of strands of said other layer, and means for uniting the crossed strands of each layer together and uniting the strands of one layer to the strands of the other layer at their crossing points.

3. In apparatus for making open mesh fabric, the combination with mechanism for laying layers of strands in respectively oppositely extending diagonal coils to form a continuous tubular body of oppositely laid and crossed diagonal coils of wire strands, continuously flattening said tubular body at one end into substantially flat layers that lie one upon the other, with the crossed strands of one layer lying between the crossed strands of the other, and means for welding together the crossed strands of each layer and the strands of the two layers at their crossing points.

4. In apparatus for making open mesh fabric, the combination with a rotatable carrier, of strand-carrying magazines mounted thereon and rotating therewith, a body-forming mandrel member, rotatable strand-laying means extending axially of the mandrel and having axially spaced strand guides for receiving the strands from the magazine and wrapping the same upon the said mandrel to form a tubular body, and means for moving the wound strands along the body as they are wrapped thereon by the laying means.

5. In apparatus for making open mesh fabric, the combination with a rotatable carrier, of strand-holding magazines mounted thereon and rotatable therewith, a forming mandrel including a plurality of conveyors moving away from the carrier, and strand-laying devices rotating with the carrier, said devices taking the strands from the magazines and laying the same in coils around the mandrel and in position to be carried away by the conveyors.

6. In apparatus for making open mesh fabric, the combination with a rotatable carrier drum, of strand-holding spools mounted thereon and rotatable therewith, a body-forming mandrel located at one end of the drum in substantial alinement therewith and including conveyors at different sides thereof having active stretches that move longitudinally away from the drum, and strand-laying arms rotatable with the drum and overlying the mandrel and conveyors to take the strands from the spools and wind the strands in coils about the mandrels and on the conveyors, said conveyors carrying the coils as they are formed away from the drum.

7. In apparatus for making open mesh fabric, the combination with a rotatable carrier drum, of sets of strand-holding spools located along the drum and rotatable therewith, a body forming mandrel located at one end of the drum in substantial alinement therewith and including conveyors at different sides thereof having active stretches that move longitudinally away from the drum, and strand-laying arms rotatable with the drum and overlying the mandrel and conveyors, each of said laying arms having means for engaging a plurality of strands from the spools and winding them in sets of coils about the mandrels and on the conveyors, said conveyors carrying the coils away from the drum as they are formed.

8. In apparatus for making open mesh fabric, the combination with a tubular body forming mandrel, of a plurality of rotatable carriers, strand holding magazines mounted on the carriers, means for rotating the carriers in opposite directions, and means for laying the strands from the magazines in opposite directions about the mandrel to form a tubular body of strands.

9. In apparatus for making open mesh fabric, the combination with an elongated tubular body-forming mandrel, of a plurality of rotatable carriers located in tandem relation at one end of the body and on a substantially common axis therewith, means for rotating the carriers in opposite directions, and means rotatable with said carriers and overlying the mandrel for laying the strands from the magazines in opposite directions about the mandrel to form an open mesh tubular body of strands.

10. In apparatus for making open mesh fabric, the combination with a body-forming mandrel, of means for laying strands in opposite directions around the same, and conveyors located at different sides of the body and moving generally lengthwise thereof to move said strands longitudinally along the body as they are wrapped thereabout.

11. In apparatus for making open mesh fabric, the combination with an elongated body forming mandrel, of rotatable carriers located in tandem relation at one end of the same and on the same general axis as the mandrel, strand magazines mounted on the carriers, strand-laying arms fixed to the respective carriers, rotatable therewith and delivering to one end of the mandrel to coil the strands in separate layers in crossed relation, and conveyors operating longitudinally of the mandrel and having means for engaging the crossed strands and moving them longitudinally along the mandrel and from the end opposite the carriers.

12. In apparatus for making open mesh fabric, the combination with an elongated body for forming a tubular mandrel, of a plurality of rotatable carriers located in tandem at one end of the body and having a substantial common axis therewith, sets of strand-holding spools on each carrier, a plurality of strand-laying arms connected to the end of each carrier and extending towards the mandrel, said arms having strand-guiding means and acting to wrap spaced strands from the spools in opposite directions in overlying layers and in crossed relation about the mandrel body to form a tubular body, and conveyors moving longitudinally of the mandrel and having means for engaging the crossed strands of the tubular body and move the same along the mandrel and away from the carrier.

13. In apparatus for making open mesh fabric, the combination with a mandrel for forming a tubular body, of means for wrapping strands in crossed relation about the same and thereby forming an open mesh tubular fabric body, and means for stripping the tubular body from the mandrel and collapsing the same in continuous condition into a sheet of multiple layers of open mesh fabric.

14. In apparatus for making open mesh fabric, the combination with a mandrel for forming a tubular body, of means for wrapping strands in crossed relation about the same, and thereby forming an open mesh tubular fabric body, and means for stripping the tubular body from the mandrel and collapsing the same into a sheet of multiple layers of open mesh fabric, and laying the crossed strands of one layer between the crossed strands of the other layer.

15. In apparatus for making open mesh fabric, the combination with a mandrel for forming a tubular body, said mandrel having a tapered and laterally spread end, of means for wrapping continuous strands around the mandrel and forming thereon a tubular body of said strands, and means for moving said body along said mandrel and collapsing the same and laterally spreading it upon the tapered end to form a multiple layered open mesh fabric of crossed strands.

16. In apparatus for making open mesh fabric, the combination with a mandrel for forming a tubular body, said mandrel having a tapered and laterally spread end, of means for wrapping continuous strands around the mandrel and forming thereon a tubular body of said strands, and oppositely disposed conveyors moving longitudinally along the mandrel and the opposite sides of the tapered end and engaging the wrapped strands to move the tubular body along the mandrel and tapered end and thereby stretch it laterally and flatten it into a multiple layered open mesh fabric sheet.

17. In apparatus for making open mesh fabric, the combination with a mandrel for forming a tubular body, of oppositely rotatable carrier drums located at one end of the carrier, means for rotating the drums in opposite directions, strand-holding magazines mounted on the carriers, laying devices carried by the drums and operating to wrap strands from the magazines in opposite directions around one end of the drums and thereby create an open mesh tubular body, and conveyors for moving the fabric body along the mandrel toward the opposite end and stretching the same laterally as it collapses it into a multiple layered sheet of open mesh fabric.

18. In apparatus for making open mesh fabric, the combination with a mandrel for forming a tubular body, of oppositely rotatable carrier drums located at one end of the carrier, means for rotating the drums in opposite directions, strand-holding magazines mounted on the carriers, laying devices carried by the drums and operating to wrap strands from the magazines in opposite directions around one end of the drums and thereby create an open mesh tubular body, conveyors for moving the fabric body along the mandrel toward the opposite end and stretching the same laterally as it collapses it into a multiple layered sheet of open mesh fabric, and means for uniting the layers.

19. In apparatus for making open mesh fabric, the combination with a mandrel for forming a tubular body, of oppositely rotatable carrier drums located at one end of the carrier in tandem relation, means for rotating the drums in opposite directions, strand holding magazines mounted on the carriers, laying arms carried by the drums and having means for guiding the strands from the magazines to the mandrel, said arms rotating in different paths around one end of the mandrel and coiling the strands in crossed relation and in a plurality of layers around said mandrel, thereby forming a tubular body, and conveyors having means for engaging opposite sides of the body, moving the same along the mandrel and stretching it laterally and collapsing it into a multiple layered sheet of open mesh fabric.

20. In apparatus for making open mesh fabric, the combination with a mandrel for forming a tubular body, of means for wrapping strands around the same to form a tubular body thereon, and means that interlock with portions of the strands of said body and laterally pull said portions apart to collapse the body into a multiple layered sheet.

21. In apparatus for making open mesh fabric, the combination with a mandrel for forming a tubular body, of means for wrapping strands around the same to form a tubular body thereon, and spaced conveyors having means for interlocking with opposite sides of said body and laterally pull said portions apart to collapse the body into a multiple layered sheet.

22. In apparatus for making open mesh fabric, the combination with a mandrel for forming a tubular body, of means for wrapping strands around the same to form a tubular body thereon, spaced conveyors operating along opposite sides of the mandrel and acting to move the body along the same, a series of hooks carried by the conveyor and adapted to engage opposite portions of the body, and means for causing the hooks to move on the conveyors to positions to interengage with the body.

23. In apparatus for making open mesh fabric, the combination with a mandrel for forming a tubular body, of means for wrapping strands around the same to form a tubular body thereon, spaced conveyors operating along opposite sides of the mandrel and acting to move the body along the same, a series of hooks carried by the conveyors and adapted to engage opposite portions of the body, and means for slidably and rotatably moving the hooks on the conveyors to positions to interengage with the body.

24. In apparatus for making open mesh fabric, the combination with a mandrel for forming a tubular body, of means for wrapping strands around the same to form a tubular body thereon, spaced conveyors operating along opposite sides of the mandrel and acting to move the body along the same, said conveyors having divergent portions at the end of the body, a series of hooks carried by the conveyors and adapted to engage opposite portions of the body, and means for causing the hooks to move on the conveyors to positions to interengage with the body, said hooks when moving along the divergent portions of the conveyors pulling the engaged portions of the body apart and collapsing said body into a multiple layered open mesh fabric sheet.

25. In apparatus for making open mesh fabric, the combination with a mandrel for forming a tubular body, of means for wrapping strands around the same to form a tubular body thereon, spaced conveyors operating along opposite sides of the mandrel and acting to move the body along the same, said conveyors having divergent portions at the end of the body, a series of hooks carried by the conveyors and adapted to engage opposite portions of the body, cam tracks alongside the conveyors, and cam members on the hooks and operated by the cam tracks to slidably and rotatably move the hooks to positions to interengage with the body, said hooks when moving along the divergent portions of the conveyors pulling the engaged portions of the body apart, and collapsing said body into a multiple layered open mesh fabric sheet.

26. In apparatus for making open mesh fabric, the combination with a mandrel for forming a tubular body, of means for wrapping wire strands continuously around the mandrel to form a tubular body of spaced coiled wires, conveyors for moving said coiled body along the mandrel and toward the opposite end thereof, said means including conveyors at opposite sides of the mandrel having divergent portions at the discharge end of the mandrel, holding devices slidably and rotatably mounted on the conveyors and having heads for engaging opposite portions of the strands when slid towards the same and locking thereupon when rotated, and cam mechanism along the conveyors for effecting said sliding and rotating movements, said holding devices acting when moving along the divergent portions of the conveyors to stretch laterally the tubular body and collapse the same into a multiple layered fabric sheet of crossed wires.

27. In apparatus for making open mesh fabric, the combination with an elongated mandrel for forming a tubular body, of rotatable carrier drums located at one end of the body, means for rotating said drums in opposite directions, wire holding spools on the drums, means rotatable with the drums for taking the wire from the spools and laying the same in crossed coils and in opposite directions on the mandrels to thereby form a tubular meshed body, said mandrel having its end opposite the drums tapered and laterally flared, conveyors operating along the mandrel and having means for engaging the coils to move the body toward the tapered flared end, certain of said conveyors extending divergently along the flared sides of the mandrel, shanks slidably and rotatably mounted on the latter conveyors and having slotted heads adapted to move to positions to receive the wires and to interlock with the same when rotated, and cam means on the shanks and along the conveyors for effecting the sliding and rotatable movements of the shanks and heads.

28. In apparatus for making open mesh fabric, the combination with means for forming a tubular body of spaced strands, of means for bringing together the walls of the said body into a multiple layered sheet having crossed strands, and welding means operating on the said strands at their crossing points to secure together the same and therefore the layers.

29. In apparatus for making open mesh fabric, the combination with means for forming a tubular body of coils of crossed strands, of means for bringing together the walls of the said body into a sheet having multiple layers of said strands, and means for welding together the strands of the layers at their crossing points and thereby securing together the layers of the sheets.

30. In apparatus for making open mesh fabric, the combination with means for forming a sheet of crossed metallic strands, of a welding mechanism having a set of electrodes for engagement with the strands on one side of the sheet and that are movable with the sheet in a direction longitudinal thereof, and a coacting set of electrodes on the other side of the sheet movable toward and from the same and the first set of electrodes, means for moving the sheet between the sets of electrodes, and means for moving the coacting set of electrodes into contact with the sheet at the crossings of the strands thereof.

31. In apparatus for making open mesh fabric, the combination with means for forming a sheet of crossed metallic strands, of a welding mechanism including a conveyor movable along one side of the sheet and having electrodes and a reciprocatory set of electrodes on the other side of the sheet movable toward and from the first set of electrodes, means for moving the sheet between the sets of electrodes and moving the conveyor and the first set of electrodes therewith, and means for reciprocating the second set of electrodes into contact with the sheet at the crossing strands thereof and into coaction with the conveyor carried electrodes.

32. In apparatus for making open mesh fabric, the combination with means for forming a sheet of crossed metallic strands, of a welding mechanism including a conveyor movable along one side of the sheet and having electrodes and a reciprocatory set of electrodes on the other side of the sheet movable toward and from the first set of electrodes, means for continuously moving the sheet between the sets of electrodes and moving the conveyor and the first set of electrodes at substantially the same speed therewith, and means for reciprocating the second set of electrodes in a timed relation to cause said latter electrodes to contact with the sheet at the crossing strands thereof and into coaction with the conveyor carried electrodes.

33. In apparatus for making open mesh fabric, the combination with a mandrel for forming a tubular body, of a plurality of rotatable carrier drums located at one end of the mandrel, means for rotating the drums in opposite directions, wire holding spools mounted on and rotatable with the drums, wire laying arms carried by the drums and rotating in opposite directions about the mandrel at one end, said arms receiving the wire from the spools and coiling it on the mandrel in crossed relation, forming an open mesh tubular fabric body, means for moving the body along the mandrel and away from the carrier drums, means for substantially flattening the tubular body to a sheet and causing opposite walls of said body to lie one upon the other and with the wires of one wall lying between the wires of the other wall, a welding mechanism, means for moving the sheet into and through the welding mechanism, and means for causing said mechanism to weld the wires together at their crossing points.

34. In apparatus for making open mesh fabric, the combination with a mandrel for forming a tubular body, of a plurality of rotatable carrier drums located at one end of the mandrel in end to end relation to each other and to the mandrel, means for rotating the drums in opposite directions, wire holding spools mounted on and rotatable with the drums, wire laying arms on the end of the drum nearest the mandrel and having means for guiding wires from the spools of said drums to the mandrel to be wrapped in coils about the mandrel, a rotatable ring at the adjacent end of the mandrel, connected to and rotatable with the more distant drum, laying arms on said ring rotating in an opposite direction to and in a different path from the first arms, said second arms receiving wires from the spools of the more distant drum and wrapping the same in coils upon the mandrel and in crossed relation to the first coils, forming an open mesh tubular fabric body, conveyors for moving said body toward the end of the mandrel and away from the drums, said mandrel having a tapered and outwardly flared end over which the body passes, certain of said conveyors having means for interlocking with the body and pulling the same laterally into a substantially flat multiple layered sheet with the wires of one layer lying between the wires of the other layer, a welding mechanism, said conveyors operating to carry the sheet into the welding mechanism, and means for actuating the welding mechanism to cause the wires at their crossing points to be welded together.

35. In apparatus for making open mesh fabric, mechanism for laying a set of parallel strands in spiral coils to form a tubular body, means for laying a second set of parallel strands in oppositely extending coils about the body so formed, whereby a reticulated tubular body is formed, means for flattening the reticulated tubular body, and means for securing the strands together at their crossing point.

36. In a wire mesh making machine, the combination with a body-forming mandrel, of a strand-laying device rotatable in one direction about the surface of the mandrel for laying coils upon the mandrel, a second strand-laying device rotatable about the surface of the mandrel in the opposite direction, for laying oppositely extending coils upon the mandrel, and means for moving the coils over the mandrel as they are laid, whereby the coils laid by the respective strand-laying devices assume the form of oppositely extending spiral coils.

37. In apparatus for making open mesh fabric, the combination with mechanism for forming an open mesh tubular body of a plurality of strands, of means for collapsing and flattening said body while maintaining its open mesh character, and thereby bringing crossing strands of the body into direct contact, and means operating upon the flattened open mesh body for uniting the crossing strands.

38. In apparatus for making open mesh fabric, the combination with mechanism for spirally laying a plurality of strands to form an open mesh tubular body, of means for collapsing and flattening the said body and bringing the crossing strands thereof into direct contact, and means operating upon the flattened open mesh body for uniting the said crossing strands.

HERBERT E. WHITE.